Nov. 5, 1968  W. S. SHAUGHNESSY  3,408,868
ELECTRICAL GRAVITY METER

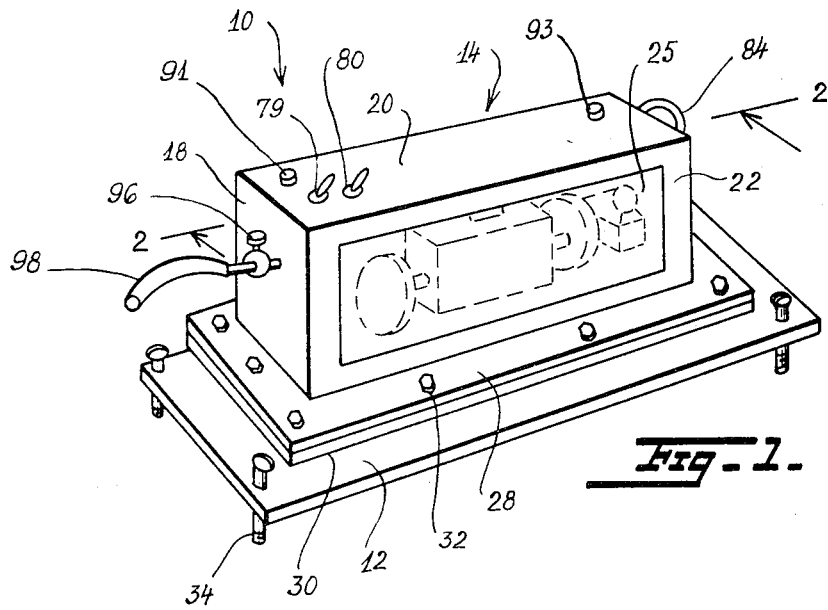
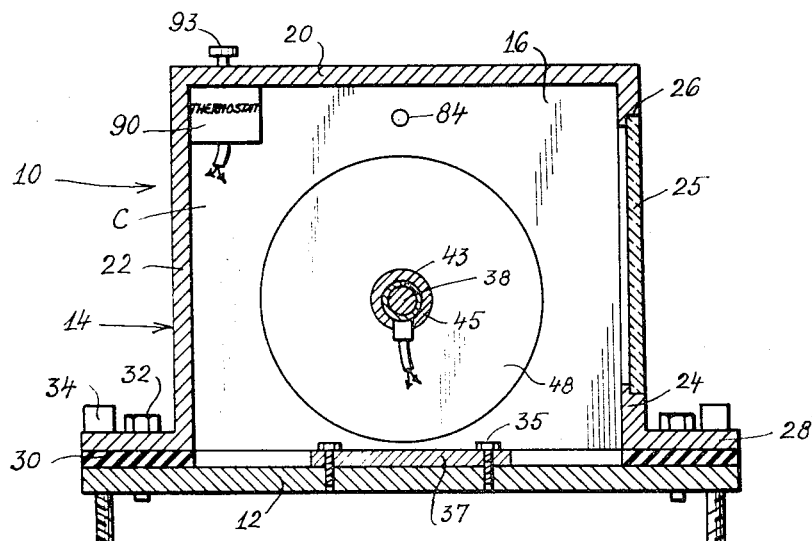

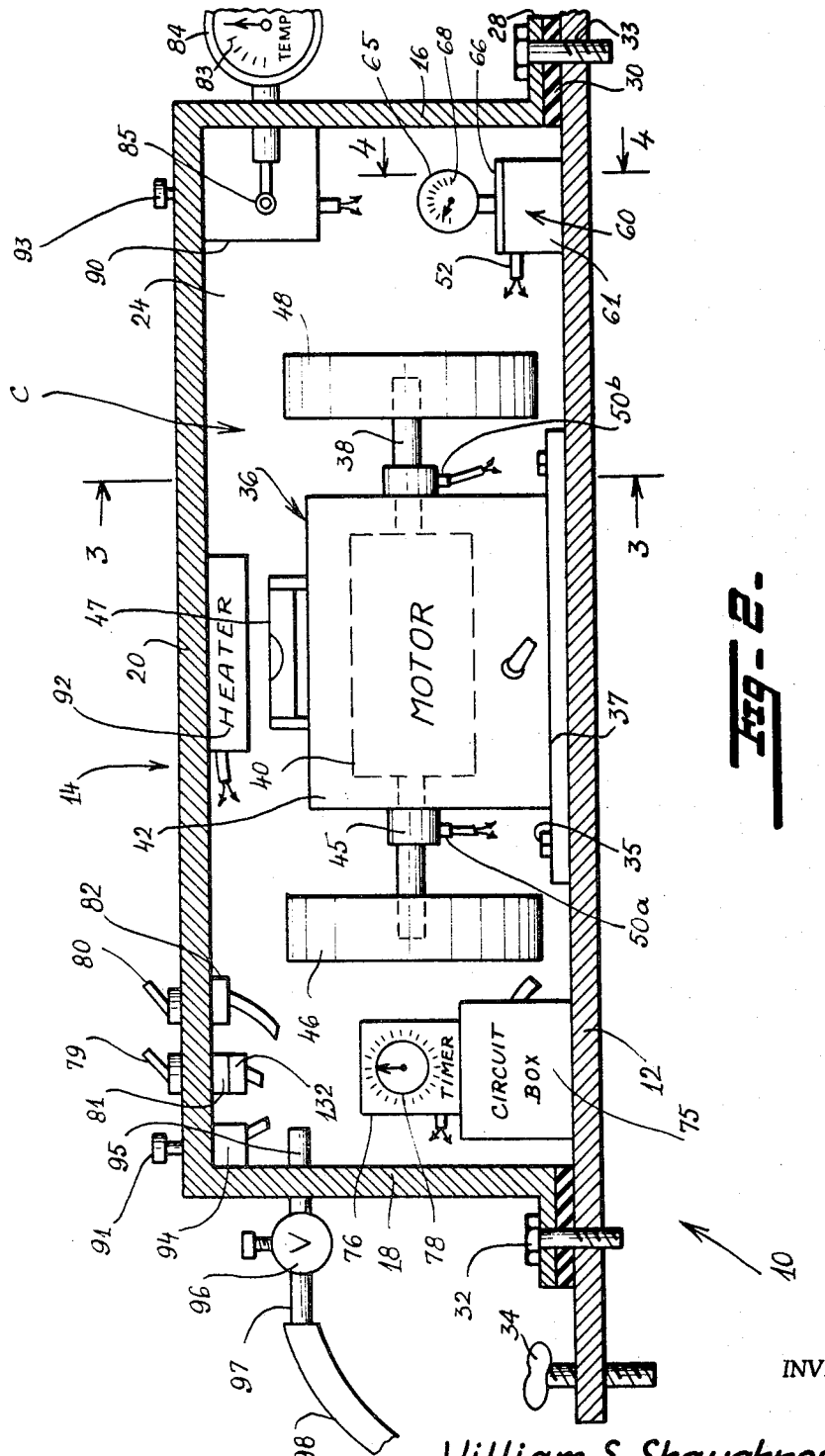

Filed Sept. 22, 1965  3 Sheets-Sheet 3

INVENTOR
William S. Shaughnessy
BY
Polachek & Saulsbury
ATTORNEYS

United States Patent Office 3,408,868
Patented Nov. 5, 1968

---

3,408,868
ELECTRICAL GRAVITY METER
William S. Shaughnessy, 39 Turner Place,
Brooklyn, N.Y. 11218
Filed Sept. 22, 1965, Ser. No. 489,226
10 Claims. (Cl. 73—382)

This invention relates to apparatus for measurement of gravitational force and changes in gravitational force.

For many purposes such as indication of the location of salt domes in oil prospecting, construction of maps of gravity and gravity gradient in geodetic surveys, detection of the presence of subterranean ore bodies, and the like, it is desirable to be able to measure the force of gravity to a high degree of accuracy with apparatus which is of small enough mass and volume to be readily portable.

It is a principal object to provide a gravity measuring device which is readily portable and which has wholly self-contained power sources.

Another object of the invention is to provide a device which enables gravitational force to be measured with a high degree of accuracy.

A further object is to provide a gravity meter which depends for its operation upon the change in effective mass of a massive body continuously rotating on a horizontal axis.

Another object is to provide a gravity meter as described which further depends for its operation upon detection and summation of incremental heating effects produced at bearings supporting the massive rotating body, over an extended period of time.

Another object is to provide a gravity meter as described which includes automatic compensation and correction means for keeping the massive body rotating at a constant speed.

A further object is to provide a gravity meter as described which avoids unbalance of the massive rotating body while undergoing change in effective mass due to changes in applied gravitational force.

Still another object is to provide a gravity meter in which gravitational force is measured in terms of heating effects produced during measured times, the heating effects occurring in bearings supporting a massive body rotating on a horizontal scale.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a reduced perspective view of a device embodying the invention.

FIG. 2 is an enlarged longitudinal vertical sectional view taken on line 2—2 of FIG. 1.

FIG. 3 is a further enlarged vertical cross sectional view taken on line 3—3 of FIG. 2.

Figure 5:
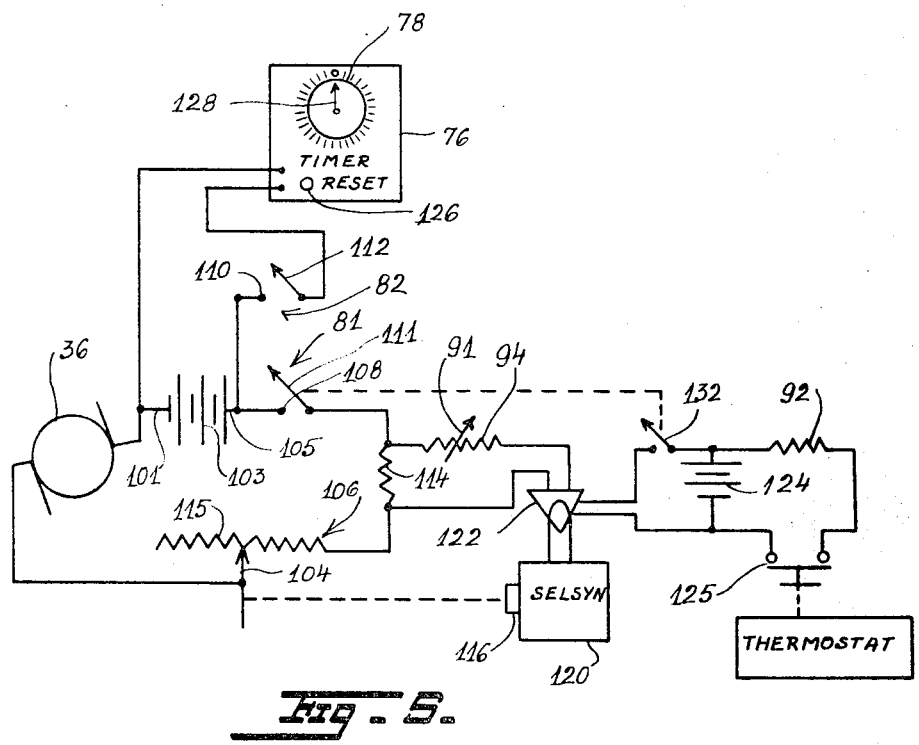
FIG. 5 is a diagram of part of the electrical system of the device.

Referring first to FIGS. 1, 2 and 3, there is shown the gravity measuring device 10 including a casing having a flat rectangular base plate 12. Mounted on the base plate is a rectangular cover 14. The cover has closed, smaller, rectangular, vertical end walls 16, 18, a closed rectangular horizontal top wall 20, and closed larger, rectangular front and rear walls 22, 24. The front wall has a transparent window 25 fitted snugly in hermetically sealed relationship at rectangular opening 26 to provide a view into the interior of the casing.

The cover has a rectangular peripheral bottom flange 28 abutting the top of plate 12 with a rectangular sealing gasket 30 interposed therebetween. Bolts 32 engaged in threaded holes 33 in the base plate and extending through registering holes in the gasket and flange effect a hermetic seal to the base plate at the open bottom of the cover. Leveling screws 34 are provided at four corners of plate 12 which extend beyond ends of the cover.

Securely mounted by bolts 35 on the base plate 12 is an electric motor 36. The motor has a base plate 37 in which bolts 35 are engaged. The motor has an axially horizontal shaft 38 extending outwardly of opposite ends of rotor 40 in the motor housing 42. The shaft rotates in stationary cylindrical bushings 43 secured in cylindrical extensions 45 of the motor housing. It is preferred that bushing 43 and shaft 38 be made of a metal alloy having substantially zero temperature coefficient of expansion, so that they are dimensionally stable over a range of temperatures. On the motor housing is a spirit level 47 visible through window 25.

Figure 4:
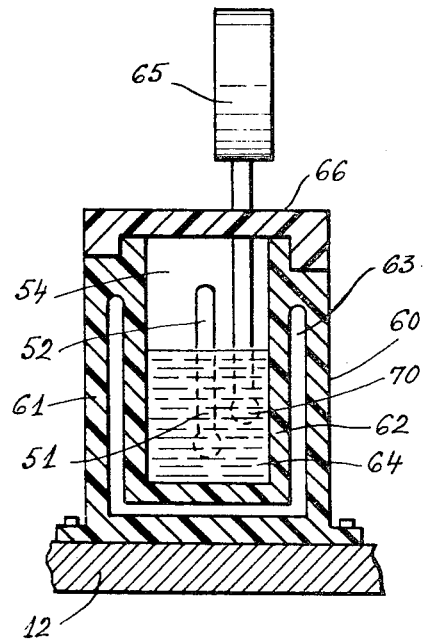
FIG. 4 is a fragmentary further enlarged sectional view taken on the line 4—4 of FIG. 2.
Figure 6:
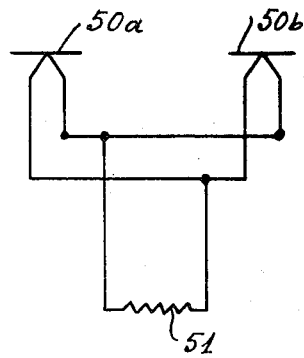
FIG. 6 is a diagram of another part of the electrical system.

Secured on opposite ends of the shaft 38 are two axially horizontal massive flywheels or disks 46, 48 of equal size. Embedded in the ends of end extensions 45 of the motor housing are two bimetallic thermoelements or thermocouples 50a, 50b. These thermoelements are connected via wires to a resistance heater element 51 disposed in a tube 52; see FIGS. 4 and 6. The tube 52 is inserted in a side wall 54 of a calorimeter 60 mounted on base plate 12.

The calorimeter has double walls 61, 62 separated by an evacuated chamber 63. The inner wall 62 defines a cup in which is a quantity of an oil or other nonvolatile fluid 64. The heater element 51 is immersed in fluid 64. A temperature gauge or thermometer 65 is mounted on cover 66 of the calorimeter. The thermometer has a dial 68 visible through the transparent window 25. The bolt 70 of the thermometer is immersed in the fluid 64.

A circuit box 75 is mounted on base plate 12 inside the cover. This box contains power supplies and other circuitry described below in connection with FIG. 5. An electrically operated timer or elapsed time indicator 76 is mounted on or near the circuit box in such a position that its dial 78 is visible through window 25. On the top of the cover is manually operable knobs 79, 80 of switches 81, 82 connected to a circuit in box 75. Another temperature gauge or thermometer 84 is mounted on end wall 16 of the cover. This gauge has its dial 83 located outside the cover and its bolt 85 extending into the chamber C defined by the base plate and cover.

Near the thermometer 84 inside the chamber C is a thermostat 90 connected in circuit with an electric heater 92 mounted under the top wall 20 just above the motor 36. Control knob 93 of the thermostat extends upwardly through wall 20 for manual operation. Knob 91 is also located on the cover to set a rheostat 94.

At end wall 18 is a short nipple 95 extending into the chamber C. A manually operable valve 96 is fitted to the nipple and on fitting 97 extending from the valve is a pipe 98 which can be connected to a suitable suction pump (not shown).

FIG. 5 shows a circuit 100 forming a part of the electrical system of the device. One terminal of motor 36 is connected to one terminal 101, a stable power supply or battery 103. Terminal 101 is also connected to one terminal of the timer 76. The other terminal of motor 36 is connected to movable arm 104 of a potentiometer 106. The other terminal 105 of the power supply 100 is connected to switch contacts 108, 110 of switches 81, 82. These switches have two electrically separate poles 111, 112 which can be closed with contacts 108, 110 respectively. Pole 111 is connected to series with resistor 114 and resistor 115 of potentiometer 106.

An arm 104 of the potentiometer is driven by shaft 116 of a synchro or selsyn 120. The selsyn is energized by an amplifier 122 powered by a power supply or battery 124. The input voltage applied to the amplifier is taken across resistor 114.

The resistance heater element 92 is connected in circuit with power supply 122 and switch 124 actuated by the thermostat 90.

In operation of the circuit 100 of FIG. 5, the thermostat is set to control heater 92 for maintaining a certain predetermined temperature within close tolerances inside of chamber C. The temperature of the chamber is indicated by thermometer 84. Motor 36 is energized and operated when switch 81 is closed. The timer 76 begins a timing cycle when switch 82 is closed. The timer has a reset control 126 for setting pointer 128 to 0 on dial 78.

Switch 132 in series with the power supply of the amplifier, is ganged to switch 81 for energizing the amplifier when this switch is closed to start the motor. Knob 91 of the variable resistor or rheostat 94 in the signal input circuit is flowing through the motor and the motor is operating at a certain speed, the selsyn 120 will set arm 104 of the potentiometer at a certain reference point. If the motor speed should tend to increase or decrease due to a change in load on bearings 43, a coordinated change will take place in the current flowing through resistor 114 and in the voltage applied to amplifier 122. The amplifier will apply an amplified signal to the selsyn which will respond by moving arm 104 of the potentiometer to change the current flowing through resistor 115 and effect a compensating change in the motor speed. The result will be that the motor speed will be held constant at all applied mechanical loads. Normally the range of change in motor loads will be less than 5%. The speed correction system can be designed to work in this range with full effectiveness. The reason for keeping the motor speed constant is important to the fundamental operating principles of the device which are now described.

It will be understood that the frictional heating of bearings 43 will be proportional to the angular velocity of the shaft 38 and combined mass of the disks 46, 48, shaft 38 and rotor or armature 40, all of which bear on the bearings 43. Stated otherwise:

(I)
$$H \propto S \times M$$

(S is proportional to S times M), where:

H is the heat in calories generated at bearings 43;
S is the linear shaft speed in centimeters per second;
M is the total mass of the rotary members 38, 40, 46, 48, in grams.

The linear shaft speed is also a function $(f)$ of the power supplied to the motor, and load on the motor and may be stated:

(II)
$$S = (f) E \times I, L$$

where E is the applied voltage, I is the applied current and L is the load on the bearings 43. Since:

(III)
$$L = K \times M$$

where K is a constant, then (IV)
$$S = (f) E \times I, M$$

It will be apparent from Equation IV that if S tends to change due to a change in M, a compensating change should be made in E or I or both so that S will remain constant. If S can be kept at a constant magnitude, then Formula I can be rewritten:

(V)
$$H \propto M$$

To hold the motor speed S constant with changes in loading of the bearings due to changes in gravitational force applied to the mass of the rotary members, the problem is simplified by keeping E in Equation IV constant. This is done by providing a constant voltage regulated power supply 103 in circuit 100. Thus only I, the current drawn by the motor, is a variable which must be coordinated with changes in mass M to keep S a constant at all friction producing loads applied to bearings 43 of the motor. According to the invention, the current I is continuously adjusted automatically as the motor speed tends to vary either instantaneously or over an extended period of time, or from time to time when the motor is operated at various times with intervals of inactivity. A conventional tachometer (not shown) such as one of the stroboscopic types can be used to ascertain the motor speed. If it is found when steady-state operating conditions prevail that the motor speed is different from that set during calibration of the device, control 91 can be operated to reset potentiometer arm 104 via the amplifier and selsyn to the point which results in operation of the motor at predetermined critical speed.

Any change in heating effect produced at the bearings 43 as apparent from Equation V will be due only to a change in mass M due to a change in gravitational force acting thereon. As the rotary mass 38, 40, 46, 48 (M) rotates, each rotation will produce a certain amount of heat at the bearings. A constant part of this heat is converted cooperatively by thermoelements 50a, 50b to a voltage which is applied to heater element 51. Heat is in effect sensed in discrete pulses of one per revolution of the rotary mass applied to fluid 64 to raise its temperature. The calorimeter thus integrates over an extended period of time heat samples, pulses, or increments generated at each rotation of the rotary mass M. If the mass M changes only minutely from a measurement at one location to another, the minute change in heating effect at the bearings can be cumulatively measured over an extended period of time, several hours for example, so that meaningful readings are obtained at thermometer 65 and timer 78. In order to assure stable and duplicatable constant conditions of operation, the heater 92 and thermostat 94 are employed to assure that the ambient environment of the motor is maintained at a certain temperature. Leveling screws 34 are adjusted to insure that the axis of rotation of the rotary shaft 38 is horizontal. Air is evacuated from the chamber C to prevent loading and frictional effects which might otherwise be produced by air in the chamber C and by moisture in such air. All possible precautions should be observed to maintain critical operating conditions in order that the detectable effect of any change in mass of the rotary mass M may be maximized.

The device will be calibrated at a particular earth latitude where the subterranean structure is known to the extent that it may be regarded as the norm. After the device is leveled by means of screws 34 and level 47, switch 81 is closed to start the motor. After a suitable period of time when transient starting conditions no longer exert any effect, the motor is regulated to a constant critical predetermined speed by proper setting of arm 104 of the potentiometer through operation of rheostat 91. Then timer 76 is started and the temperature reading of fluid 64 is taken. After the temperature has risen a predetermined further amount, 1° C. for example, the time indicated on timer 76 is noted. This is the calibration temperature and time for this earth latitude and elevation. Now the motor and timer can be turned off. The device can be moved to another location at substantially the same latitude and elevation.

At the new location the motor will then be turned. After steady state conditions prevail, the timer will be started and the time required for the temperature to rise the same predetermined amount as during calibration will be noted. If the time is materially different, this indicates a material change has occurred in the gravitational force acting in the rotary mass M. The massive rotating disks form the larger part of this rotary mass. They have high inertia and serve to minimize transient instantaneous changes in speed of the rotary mass. More extensive changes in speed are corrected by operation of the selsyn 120. By a knowledge of the terrain and operating conditions the operator of the device will know if the noted change in mass is due to a different subterranean condition from that at the norm, calibration location. Thus the device when serving as gravity meter, may be used in oil and mineral prospecting.

For optimum use of the device calibration measurements will be made and tabulated at various latitudes and elevations. By following the operating principles described above, the device can be used to plot gravity contour lines. Thus the general size of a subterranean anomaly such as an ore deposit can be determined. Other uses of the device such as determining earth elevations, gravity gradients, etc. will readily occur to those familiar with devices of this general character.

The present device is simplified in mechanical and electrical structure than prior gravity meters providing comparable measurements. For its size and arrangement it provides gravitational measurements equivalent in accuracy to those obtained only by more complex, expensive, less portable instruments.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A gravitational force measuring device, comprising a support, an electric motor mounted on said support, said motor having an axially horizontal rotor and bearing means rotatably supporting said rotor, means for keeping said rotor rotating at a constant speed at all loads applied frictionally to said bearing means, means at said bearing means for detecting frictional heat pulses generated thereat during each rotation of the rotor, and means for integrating measurements of heat pulses generated at said bearing means over a period of time, whereby the gravitational force exerted on the mass of said rotor is determined by an integrated measurement of said heat pulses over said period of time, and whereby a change in said gravitational force is measured by a change in said integrated measurement of said heat pulses.

2. A gravitational force measuring device, comprising a support, an electric motor mounted on said support, said motor having a rotor including an axially horizontal rotary shaft and bearings at opposite ends of the motor rotatably supporting said shaft, a massive flywheel on one end of said shaft, a thermoelement at one of the bearings at said one end of the shaft for detecting frictional heat pulses generated at said one bearing during rotation of the rotor and flywheel, a calorimeter, an electrical resistance element at said calorimeter connected to said thermoelement and heated by pulses electrically applied from said thermoelement, whereby said calorimeter over a period of time measures total heat radiated by said heater element, a power supply connected in circuit with said motor to energize the same, and current control means connected in said circuit to compensate for any change in current applied to the motor due to a change in speed of rotation of said rotor from a predetermined speed whereby the speed of rotation of the rotor is restored to said predetermined speed, so that any change in the rate of heating of said thermoelement is due only to a change in gravitational force acting on said rotor and flywheel, and whereby said change in gravitational force is in effect determined by integrated measurements of heat increments by said calorimeter during said period of time.

3. A gravitational force measuring device, comprising a support, an electric motor mounted on said support, said motor having a rotor including an axially horizontal rotary shaft and bearings at opposite ends of the motor rotatably supporting said shaft, massive flywheels at opposite ends of said shaft, thermoelements at the bearing for detecting frictional heat pulses generated at the bearings during rotation of the rotor and flywheels, means for keeping the rotor and flywheels rotating at a constant predetermined speed at all loads applied frictionally to the bearings, and a calorimeter connected to the thermoelements to integrate measurements of heat pulses generated at the bearings over a period of time, whereby the gravitational force exerted on the combined mass of the rotor and flywheels is determined by an integrated measurement of said heat pulses over said period of time and whereby any change in said gravitational force is measured by a change in said integrated measurement of heat pulses.

4. A gravitational force measuring device, comprising a support, an electric motor mounted on said support, said motor having a rotor including an axially horizontal rotary shaft and bearings at opposite ends of the motor rotatably supporting said shaft, massive flywheels at opposite ends of said shaft, thermoelements at the bearings for detecting frictional heat pulses generated at the bearings during rotation of the rotor and flywheels, means for keeping the rotor and flywheels rotating at a constant predetermined speed at all loads applied frictionally to the bearings, and a calorimeter connected to the thermoelements to integrate measurements of heat pulses generated at the bearings over a period of time, whereby the gravitational force exerted on the combined mass of the rotor and flywheels is determined by an integrated measurement of said heat pulses over said period of time and whereby any change in said gravitational force is measured by a change in said integrated measurement of heat pulses, said current control means comprising a potentiometer connected in series with the motor, a selsyn connected to the potentiometer for changing the resistance setting of the potentiometer, and amplifier means connected between said circuit and selsyn to detect any change in current drawn by the motor, whereby said selsyn adjusts said potentiometer to pass such a current that the speed of the motor is maintained constant.

5. A gravitational force measuring device, comprising a support, an electric motor mounted on said support, said motor having a rotor including an axially horizontal rotary shaft and bearings at opposite ends of the motor rotatably supporting said shaft, a massive flywheel on one end of said shaft, a thermoelement at one of bearings at said one end of the shaft for detecting frictional heat pulses generated at said one bearing during rotation of the rotor and flywheel, a calorimeter, an electrical resistance element at said calorimeter connected to said thermoelement and heated by pulses electrically applied from said thermoelement, whereby said calorimeter over a period of time measures total heat radiated by said heater element, a power supply connected in circuit with said motor to energize the same, and current control means connected in said circuit to compensate for any change in current applied to the motor due to a change in speed of rotation of said rotor from a predetermined speed whereby the speed of rotation of the rotor is restored to said predetermined speed, so that any change in the rate of heating of said thermoelement is due only to a change in gravitational force acting on said rotor and flywheel, and whereby said change in gravitational force is in effect determined by integrated measurements of heat increments by said calorimeter during said period of time, said current control means comprising a potentiometer connected in series with the motor, a selsyn connected to the potentiometer for changing the resistance setting of the potentiometer, and amplifier means connected between said circuit and selsyn to detect any change in current drawn by the motor, whereby said selsyn adjusts said potentiometer to pass such a current that the speed of the motor is maintained constant.

6. A gravitational force measuring device, comprising a support, an electric motor mounted on said support, said motor having a rotor including an axially horizontal rotary shaft and bearings at opposite ends of the motor rotatably supporting said shaft, massive flywheels at opposite ends of said shaft, thermoelements at the bearings for detecting frictional heat pulses generated at the bearing during rotation of the rotor and flywheels, a calorimeter, and electrical resistance element at said calorimeter connected to the thermoelements and heated by pulses electrically applied from the thermoelements, whereby said calorimeter over a period of time measures total heat radiated by said heater element, a power supply connected in circuit with said motor to energize the same, and current control means connected in said circuit to compensate for any change in current applied to the motor due to a change in speed of rotation of said rotor from a predetermined speed whereby the speed of rotation of the rotor is restored to said predetermined speed, so that any change in the rate of heating of said thermoelement is due only to a change in gravitational force acting on said rotor and flywheel, and whereby said change in gravitational force is in effect determined by integrated measurements of heat increments by said calorimeter during said period of time.

7. A gravitational force measuring device, comprising a support, an electric motor mounted on said support, said motor having a rotor including an axially horizontal rotary shaft and bearings at opposite ends of the motor rotatably supporting said shaft, massive flywheels at opposite ends of said shaft, thermoelements at the bearings for detecting frictional heat pulses generated at the bearings during rotation of the rotor and flywheels, a calorimeter, an electrical resistance element at said calorimeter connected to the thermoelements and heated by pulses electrically applied from the thermoelements, whereby said calorimeter over a period of time measures total heat radiated by said heater element, a power supply connected in circuit with said motor to energize the same, and current control means connected in said circuit to compensate for any change in current applied to the motor due to a change in speed of rotation of said rotor from a predetermined speed whereby the speed of rotation of the rotor is restored to said predetermined speed, so that any change in the rate of heating of said thermoelement is due only to a change in gravitational force acting on said rotor and flywheel, and whereby said change in gravitational force is in effect determined by integrated measurements of heat increments by said calorimeter during said period of time, said current control means comprising a potentiometer connected in series with the motor, a selsyn connected to the potentiometer for changing the resistance setting of the potentiometer, and amplifier means connected between said circuit and selsyn to detect any change in current drawn by the motor, whereby said selsyn adjusts said potentiometer to pass such a current that the speed of the motor is maintained constant.

8. A gravitational force measuring device, comprising a support, an electric motor mounted on said support, said motor having a rotor including an axially horizontal rotary shaft and bearings at opposite ends of the motor rotatably supporting said shaft, a massive flywheel on one end of said shaft, a thermoelement at one of the bearings at said one end of the shaft for detecting frictional heat pulses generated at said one bearing during rotation of the rotor and flywheel, a calorimeter, an electrical resistance element at said calorimeter connected to said thermoelement and heated by pulses electrically applied from said thermoelement, whereby said calorimeter over a period of time measures total heat radiated by said heater element, a power supply connected in circuit with said motor to energize the same, and current control means connected in said circuit to compensate for any change in current applied to the motor due to a change in speed of rotation of said rotor from a predetermined speed whereby the speed of rotation of the rotor is restored to said predetermined speed, so that any change in the rate of heating of said thermoelement is due only to a change in gravitational force acting on said rotor and flywheel, and whereby said change in gravitationl force is in effect determined by integrated measurements of heat increments by said calorimeter during said period of time, said support including a closed casing, said calorimeter being located in said casing, means for evacuating air from the casing, and means for keeping the temperature inside said casing at a predetermined constant value, whereby said motor operates in an ambient environment maintained substantially stable.

9. A gravitational force measuring device, comprising a support, an electric motor mounted on said support, said motor having a rotor including an axially horizontal rotary shaft and bearings at opposite ends of the motor rotatably supporting said shaft, a massive flywheel on one end of said shaft, a thermoelement at one of the bearings at said one end of the shaft for detecting frictional heat pulses generated at said one bearing during rotation of the rotor and flywheel, a calorimeter, an electrical resistance element at said calorimeter connected to said thermoelement and heated by pulses electrically applied from said thermoelement, whereby said calorimeter over a period of time measures total heat radiated by said heater element, a power supply connected in circuit with said motor to energize the same, and current control means connected in said circuit to compensate for any change in current applied to the motor due to a change in speed of rotation of said rotor from a predetermined speed whereby the speed of rotation of the rotor is restored to said predetermined speed, so that any change in the rate of heating of said thermoelement is due only to a change in gravitational force acting on said rotor and flywheel, and whereby said change in gravitational force is in effect determined by integrated measurements of heat increments by said calorimeter during said period of time, said support including a closed casing, said calorimeter being located in said casing, means for evacuating air from the casing, and means for keeping the temperature inside said casing at a predetermined constant value, whereby said motor operates in an ambient environment maintained substantially stable, and adjustable leveling means on said casing to maintain the axis of said rotor in a true horizontal position during rotation of the rotor.

10. A gravitational force measuring device, comprising a support, an electric motor mounted on said support, said motor having a rotor including an axially horizontal rotary shaft and bearings at opposite ends of the motor rotatably supporting said shaft, massive flywheels at opposite ends of said shaft, thermoelements at the bearings for detecting frictional heat pulses generated at the bearings during rotation of the rotor and flywheels, means for keeping the rotor and flywheels rotating at a constant predetermined speed at all loads applied frictionally to the bearings, and a calorimeter connected to the thermoelements to integrate measurements of heat pulses generated at the bearings over a period of time, whereby the gravitational force exerted on the combined mass of the rotor and flywheels is determined by an integrated measurement of said heat pulses over said period of time and whereby any change in said gravitational force is measured by a change in said integrated measurement of heat pulses, said current control means comprising a potentiometer connected in series with the motor, a selsyn connected to the potentiometer for changing the resistance setting of the potentiometer, and amplifier means connected between said circuit and selsyn to detect any change in current drawn by the motor, whereby said selsyn adjusts said potentiometer to pass such a current that the speed of the motor is maintained constant, said support including a base plate, a removable cover on said plate, means holding said cover in hermetically sealed relationship to base plate, means for evacuating air from the casing, means for keeping the temperature inside the casing at a predetermined constant value, and adjustable leveling means on said casing to maintain the axis of the rotor in true horizontal position during rotation of the rotor, whereby the motor operates in an ambient environment maintained substantially stable.

References Cited

UNITED STATES PATENTS

| 2,936,624 | 5/1960 | Schalkowsky et al. | 73—516 |
| 3,178,946 | 4/1965 | Talbot | 73—517 |

RICHARD C. QUEISSER, *Primary Examiner.*

JOHN R. FLANAGAN, *Assistant Examiner.*